United States Patent
Scherf

(10) Patent No.: US 8,237,040 B2
(45) Date of Patent: Aug. 7, 2012

(54) METHOD AND SYSTEM OF PURPOSEFUL MOVEMENT TO A STEADY BEAT

(75) Inventor: Roberta Scherf, River Falls, WI (US)

(73) Assignee: Thinking Moves, LLC, River Falls, WI (US)

( * ) Notice: Subject to any disclaimer, the term of this patent is extended or adjusted under 35 U.S.C. 154(b) by 0 days.

(21) Appl. No.: 12/626,477

(22) Filed: Nov. 25, 2009

(65) Prior Publication Data

US 2010/0300272 A1 Dec. 2, 2010

Related U.S. Application Data

(63) Continuation of application No. PCT/US2008/064739, filed on May 23, 2008.

(60) Provisional application No. 60/931,856, filed on May 25, 2007.

(51) Int. Cl.
*G09B 15/00* (2006.01)
*G09B 15/02* (2006.01)
*G09B 15/04* (2006.01)
*G10H 3/06* (2006.01)

(52) U.S. Cl. ........................ 84/470 R; 84/724

(58) Field of Classification Search ................ 84/470 R, 84/724
See application file for complete search history.

(56) References Cited

U.S. PATENT DOCUMENTS

| 4,776,323 | A | 10/1988 | Spector |
| 5,215,468 | A | 6/1993 | Lauffer et al. |
| 6,450,886 | B1 | 9/2002 | Oishi et al. |
| 6,450,888 | B1 * | 9/2002 | Takase et al. ................ 463/43 |
| 6,453,111 | B1 | 9/2002 | Sklar et al. |
| 6,685,480 | B2 | 2/2004 | Nishimoto et al. |
| 6,716,139 | B1 | 4/2004 | Hosseinzadeh-Dolkhani et al. |
| 6,746,247 | B2 * | 6/2004 | Barton ........................ 434/247 |
| 7,128,649 | B2 * | 10/2006 | Nobe et al. .................... 463/23 |
| 7,853,249 | B2 * | 12/2010 | Regnier ....................... 455/420 |
| 2001/0016510 | A1 * | 8/2001 | Ishikawa et al. .................. 463/7 |
| 2002/0055383 | A1 | 5/2002 | Onda et al. |
| 2002/0155416 | A1 * | 10/2002 | Barton ........................ 434/247 |
| 2004/0082381 | A1 * | 4/2004 | Annunziata .................... 463/35 |
| 2004/0229731 | A1 | 11/2004 | Mitchell |
| 2006/0245599 | A1 * | 11/2006 | Regnier ......................... 381/79 |
| 2006/0266200 | A1 * | 11/2006 | Goodwin ....................... 84/611 |
| 2007/0269773 | A1 * | 11/2007 | Slade ............................ 434/98 |
| 2010/0164960 | A1 * | 7/2010 | Asami .......................... 345/473 |
| 2011/0053131 | A1 * | 3/2011 | Regnier et al. ................ 434/250 |

FOREIGN PATENT DOCUMENTS

| JP | 2002-165912 | 6/2002 |
| JP | 2006-196017 | 7/2006 |
| KR | 10-2004-0008378 | 1/2004 |
| KR | 10-2007-0008238 | 1/2007 |

* cited by examiner

*Primary Examiner* — Jeffrey Donels
(74) *Attorney, Agent, or Firm* — Merchant & Gould P.C.

(57) ABSTRACT

A technique for combining music and choreographed movement improves physiological and cognitive processes through purposeful movement to a steady beat. Users perform examples of the technique by purposefully executing one or more movement instructions in time with one or more musical selections. The movement instructions require concentration on both the beat pattern of the music and on the movement pattern to execute the movement instruction successfully.

20 Claims, 12 Drawing Sheets

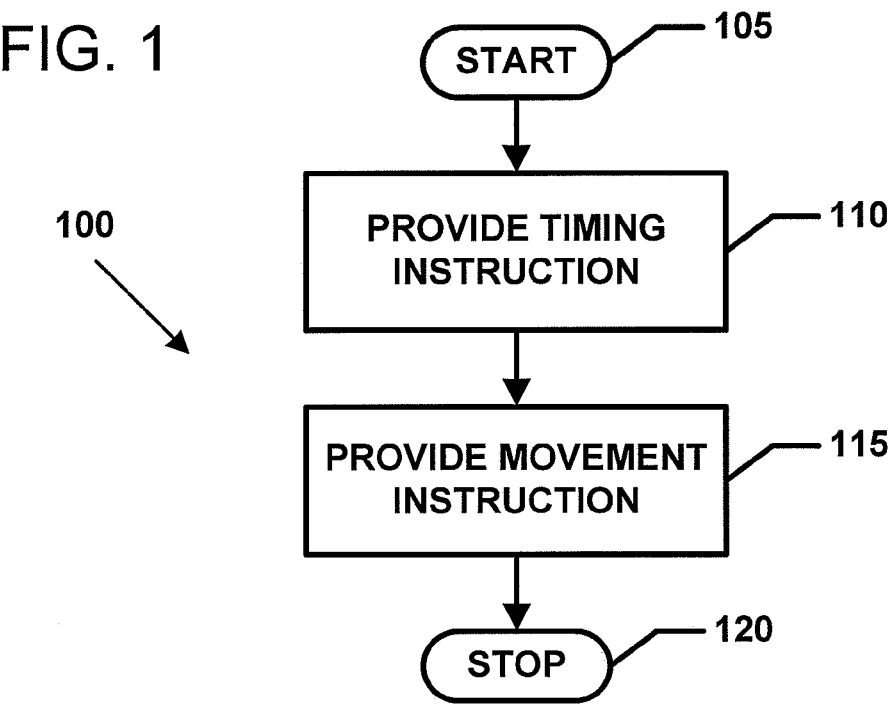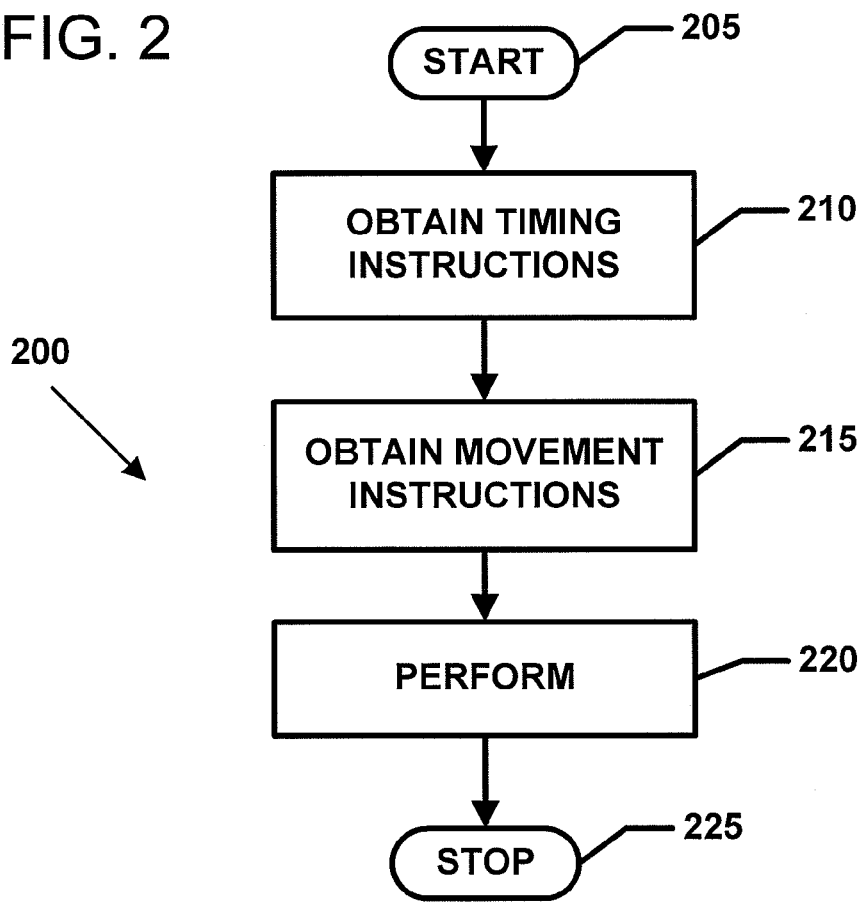

1200

1300

1900

2010
2001
2002
2003

2020

2030
2002
2004

2040
2001

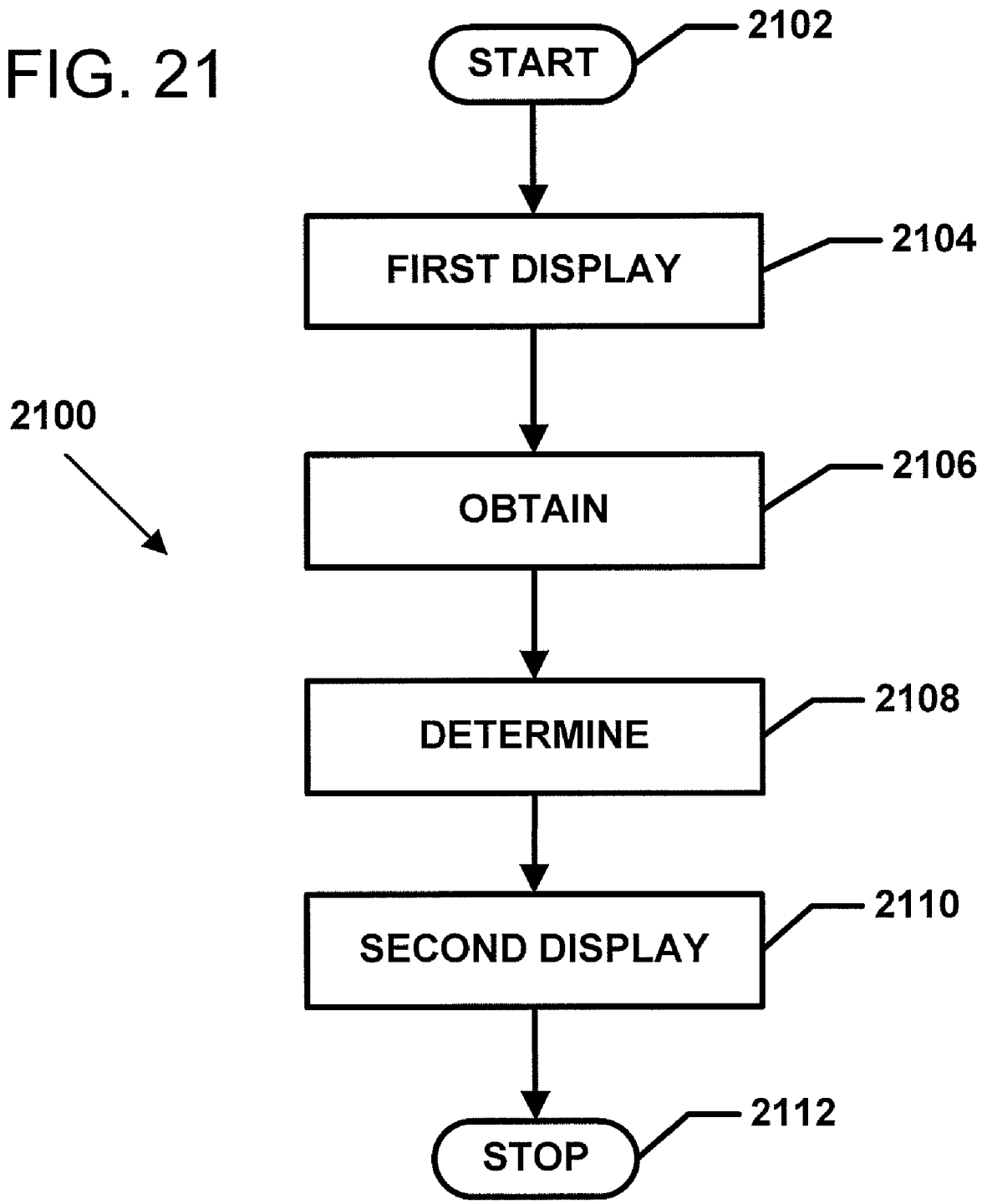

METHOD AND SYSTEM OF PURPOSEFUL MOVEMENT TO A STEADY BEAT

This application is a Continuation of PCT/US2008/064739, filed 23 May 2008, in the name of Thinking Moves, LLC, a U.S. national corporation, applicant for the designation of all countries except the U.S., and Roberta SCHERF, a citizen of the U.S., applicant for the designation of the U.S. only, and claims priority to U.S. Provisional Patent Application Ser. No. 60/931,856 filed on 25 May 2007, and which applications are incorporated herein by reference. To the extent appropriate, a claim of priority is made to each of the above disclosed applications.

TECHNICAL FIELD

The present invention relates to a method and system of human movement instruction and, in particular, to media teaching purposeful movement to a steady beat.

BACKGROUND

Human cognitive functions are affected by music and bodily movement. Learning can be difficult without basic rhythmic skills. Rhythm underlies patterns of breathing and movement and helps to organize incoming sensory perception into coherent new patterns of learning. Movement has been shown to raise the levels of endorphins, which are important to mood, cognition, behavior, and personality, in the brain. Movement also can stimulate a person's metabolism and build muscles.

Exercise videos combine music and movement to demonstrate techniques to burn fat or increase muscle tone. The videos teach users movements chosen for their ability to increase the user's metabolism or to facilitate muscle growth. Such videos generally require the user to learn the new exercise move and then perform the exercise move. Typically, the music in such videos is meant primarily as a form of entertainment to keep the interest of the individual. In some exercise videos, the music can be used to set a rhythm to which the movements are performed.

Interactive video games, especially those in which participants must match certain dance steps, also combine music and movement for entertainment purposes. In such games, a user watches a display monitor, such as a television screen, and reacts to images shown on the monitor. Sensors monitor the movements of the user in response to the displayed images. Some games also require the user to react to images displayed on the screen and in response to music being played to the user. For example, Dance, Dance, Revolution™ requires users to view dance steps on a video display screen and then mimic the dance steps using a mat equipped to record the movements of the user.

SUMMARY

The invention relates to media combining music and choreographed movement to present one or more body puzzles to a user. In particular, the invention relates to media teaching purposeful activity within three-dimensional space according to movement instructions and timing instructions.

According to aspects of the invention, users perform embodiments of the body puzzles by purposefully executing choreographic instructions including one or more movement instructions in accordance with a timing instruction. In one embodiment, a timing instruction includes one or more musical selections. Execution of the choreographic instruction requires focus on both the beat pattern of the music and on a movement pattern indicated by the movement instruction.

In some embodiments, the choreographic instructions require a user to perform one movement with a right side of the user's body and a different move with the left side of the user's body simultaneously. In one embodiment, the body puzzles require upper level bilateral integration nested in a rhythmic program. In another embodiment, the body puzzles require lower level bilateral integration nested in a rhythmic program. In yet another embodiment, the body puzzles require upper and lower level bilateral integration nested in a rhythmic program.

According to other aspects of the invention, users view movement instructions and identify patterns and flow directions. In one embodiment, the movement instructions include indicia of three-dimensional movements based on geometric shapes. In another embodiment, the movement instructions progress from symmetrical to alternating bilateral patterns. In another embodiment, the movement instructions include differentiated and/or coordinated bilateral patterns.

In one embodiment, users attempt to mirror the movements of an instructor. In other embodiment, users attempt to follow generated audio-visual cues. In one embodiment, users view a diagram indicating the general shape of the movement to be performed. In another embodiment, users view movement of indicia (e.g., an indicator ball) and attempt to mimic the movement. For example, users may view and attempt to follow colored flow paths displayed on a display screen.

According to other aspects of the invention, participants listen to music and identify timing instructions (e.g., beat patterns). In an embodiment, the music includes polyrhythmic elements and/or timing.

BRIEF DESCRIPTION OF THE DRAWINGS

Referring now to the drawings wherein like reference letters and numerals indicate corresponding structure throughout the several views:

FIG. 1 is a flow chart illustrating an operational flow of an instruction process for providing a choreograph instruction to a user in accordance with the principles of the present disclosure;

FIG. 2 is a flow chart illustrating an operational flow of a performance process for performing the choreograph instruction of FIG. 1 in accordance with the principles of the present disclosure;

FIG. 21 is a flowchart illustrating an operational flow for an example evaluation process by which choreographic instructions and feedback may be presented to the participant.

DETAILED DESCRIPTION

Figure 3:
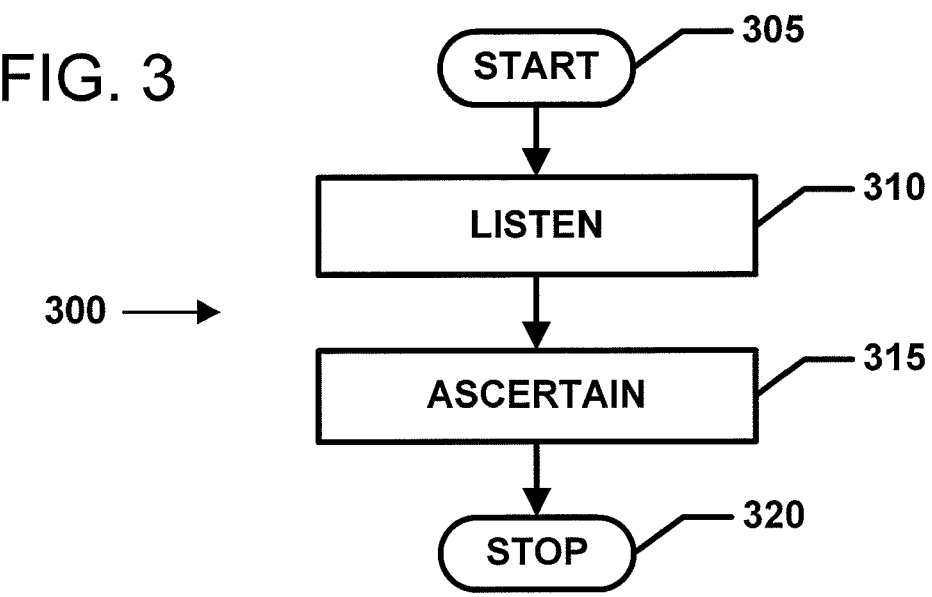
FIG. 3 is a flow chart illustrating an operational flow of a process for performing the timing instruction of FIG. 2 in accordance with the principles of the present disclosure.

The present disclosure is directed to systems and methods for providing choreographic instructions to one or more users. In general, a choreographic instruction includes a timing instruction and a movement instruction. The movement instruction is performed by the users in accordance with the timing instruction.

Referring now to the figures, FIG. 1 illustrates an operational flow for an instruction process 100 for providing choreographic instructions to a user. Each choreographic instruction includes a timing instruction and a movement instruction. The instruction process 100 initializes and begins at start module 105 and proceeds to a first provide operation 110. The first provide operation 110 provides a timing instruction to at least one user. In certain embodiments, the first provide operation 110 provides an auditory depiction of a beat pattern. For example, in one embodiment, the first provide operation 110 plays a musical selection having polyrhythmic elements and/or timing. In other embodiments, however, the first provide operation 110 can provide a visual depiction of a beat pattern (e.g., see FIG. 8).

A second provide operation 115 provides at least one movement instruction to the user. In some embodiments, a movement instruction includes a movement pattern and a flow direction. In other embodiments, a movement instruction includes a series of formation patterns and a sequencing instruction. In certain embodiments, a movement instruction also includes a repetition amount indicating the number of times the movement pattern should be repeated. In some embodiments, the second provide operation 115 supplies a sequence of movement instructions. In other embodiments, however, the second provide operation 115 supplies only a single movement instruction.

In general, a movement instruction may include one or more movements and/or formation patterns based on geometric or otherwise recognizable patterns and/or elements (e.g., lines, circles, triangles, etc.). For example, in one embodiment, the movement instruction can instruct a participant to move one or more portions of the participant's body in a particular direction along a circular, triangular, square, or heart-shaped pattern (e.g., see FIGS. 5 and 6).

In another embodiment, the movement instruction can instruct a participant to position one or more portions of the participant's body to form one or more formation patterns. The movement instruction also can instruct the participant to move appropriate portions of the participant's body to re-orient the formation pattern or form new formation patterns. For example, in one such embodiment, the movement instruction can instruct the participant to move each arm to form an L pattern (e.g., see formation pattern 1900 of FIG. 19) in different orientations (e.g., see FIGS. 20A-20D).

The movement instruction can be performed within two-dimensional space or three-dimensional space. For example, in one embodiment, the movement instruction can indicate a first geometric pattern to be executed over a first spatial plane and a second geometric pattern to be executed over a second spatial plane angled relative to the first spatial plane. In another embodiment, two or more movement instructions may be executed over the same spatial plane.

In some embodiments, the movement instruction indicates a movement to be performed on each of the left and right sides of a participant's body (i.e., homologous symmetrical movement). In another embodiment, the movement instruction indicates a movement to be performed using both sides of the participant's body (i.e., the movement extends across the body of the participant). In other embodiments, however, the movement instruction can indicate a first movement to be performed by a left side of the participant's body and a second movement to be performed by a right portion of the participant's body (i.e., bilateral movement). For example, in one embodiment, the movement instruction can provide a first pattern to be executed with a participant's right hand and a second pattern to be executed with the participant's left hand simultaneously. The first movement can differ from the second movement in pattern size, pattern shape, pattern orientation, and/or flow direction.

In one embodiment, the second provide operation 115 provides a movement instruction indicating one or more anchor movements. The second provide operation 115 also can provide additional movement instructions incorporating the anchor movements into a focus movement. For example, in one embodiment, the second provide operation 115 may provide a first anchor movement including a first pattern and flow direction (e.g., see circle pattern 1302 of FIG. 13) and a second anchor movement including a second pattern and flow direction (e.g., see triangular pattern 1306 of FIG. 13). The second provide operation 115 also may provide a focus movement (e.g., see movement pattern 1300 of FIG. 13) incorporating the first movement and second movements. The instruction process 100 completes and ends at stop module 120.

FIG. 2 illustrates an operational flow for a performance process 200 for deriving one or more choreographic instructions from an instructional media or other tool and performing the choreographic instruction. The performance process 200 initializes and begins at a start module 205 and proceeds to a first obtain operation 210. The first obtain operation 210 receives a timing instruction. In certain embodiments, the first obtain operation 210 receives an auditory depiction of a beat pattern. For example, in one embodiment, the first obtain operation 210 plays a musical selection having polyrhythmic elements and/or timing. In other embodiments, however, the first obtain operation 210 receives a visual depiction of a beat pattern (e.g., see FIG. 8).

A second obtain operation 215 receives at least one movement instruction to be executed. In general, the movement instruction includes a movement pattern and a flow direction. In certain embodiments, the movement instruction also includes a repetition amount indicating a number of times the movement pattern should be repeated. In some embodiments, the second obtain operation 215 receives a sequence of movement instructions. In other embodiments, however, the second obtain operation 215 receives only a single movement instruction.

A perform operation 220 executes each movement instruction received in the second obtain operation 215 in accordance with the timing instruction received in the first obtain operation 210. In certain embodiments, the perform operation 220 executes each movement instruction sequentially. In other embodiments, however, multiple movement instructions are performed simultaneously using different portions of the participant's body. In some embodiments, the perform operation 220 is executed by a single user. In other embodiments, however, the perform operation 220 can be executed by multiple users. The performance process 200 completes and ends at stop module 225.

The performance process 200 may be performed and optionally repeated over a predetermined period of time referred to as a session. For example, in some embodiments, the performance process 200 is executed over a period of a few minutes per session. In one embodiment, the performance process 200 is executed over a period of two to five minutes. In other embodiments, a session may last for a longer or shorter period of time. The length of time over which the performance process 200 is executed in each session may vary by difficulty of the movement to be performed. Users may participate in one or more sessions each day.

FIG. 3 illustrates an operational flow for a process 300 for implementing the first obtain operation 210 of the performance process 200. The process 300 initializes and begins at start module 305 and proceeds to a listen operation 310. In listen operation 310, the participant perceives (e.g., listens to) a musical selection being played.

In general, the music selection is selected to be enjoyable to the participant. In some embodiments, the musical selection can be personalized to the listener. For example, in one embodiment of the listen operation 210, the participant perceives music selected from favorite musical pieces of the participant. In another embodiment of the listen operation 210, the participant listens to music popular when the participant was a teenager or young adult. Some examples of musical genres that have been found to work well for providing timing instructions are jazz, classical, and Swedish fiddle music. However, other types of music also may be suitable.

In a determine operation 315, the participant ascertains a beat pattern employed in the musical selection. In some embodiments, the beat pattern of each musical piece includes from about sixty to about seventy-two beats per minute. In other embodiments, the beat pattern of each musical piece includes from about forty-eight to about sixty beats per minute. In one embodiment, the musical selection has about sixty beats per minute. The beat pattern of the music can be selected to enhance or lessen the difficulty of executing the movement instructions.

In some embodiments, the beat pattern of each musical selection is clearly discernable. In such embodiments, the beat pattern is simple and easily noticeable, enabling the participant to concentrate more heavily on executing the movement instructions. Such embodiments are especially useful when beginning or learning the technique.

In other embodiments, however, the beat pattern can be more complex or less easily discernable (e.g., can have polyrhythmic elements and/or timing). In such embodiments, the participant focuses more on the music to distinguish the beat pattern. Such embodiments require more thought and are especially useful for advanced users of the choreographic instruction. The process completes and ends at stop module 320.

Figure 4:
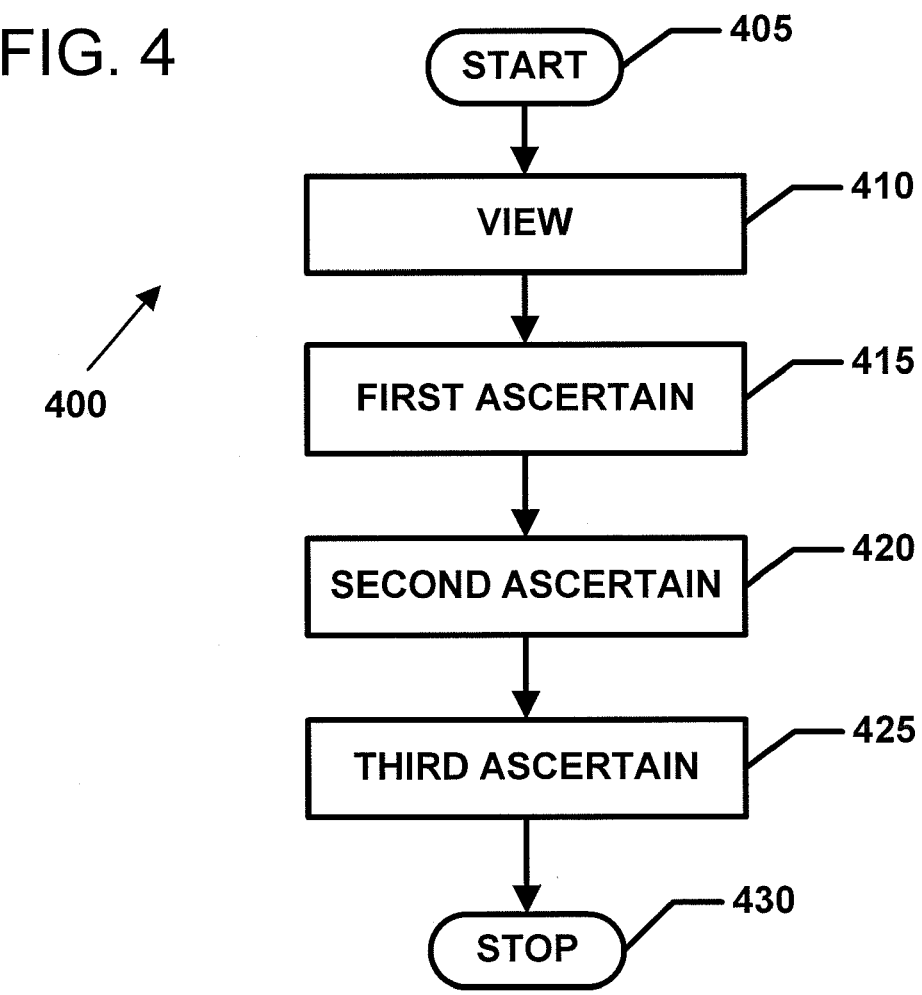
FIG. 4 is a flow chart illustrating an operational flow of a process for performing the movement instruction of FIG. 2 in accordance with the principles of the present disclosure.

FIG. 4 illustrates an operational flow for an example process 400 for implementing the second obtain operation 215 of performance process 200. The process 400 initializes and begins at a start module 405 and proceeds to a view operation 410. In the view operation 410, the participant perceives (e.g., views) a portrayal of a movement instruction.

In some embodiments of the view operation 410, the participant examines a graphic depiction of a still-image representing a movement instruction. For example, in one such embodiment of the view operation 410, the participant examines a card, such as a card 500 (see FIG. 5). The card 500 includes a graphical depiction (e.g., a drawing) 502 of a geometric element, a directional arrow 504, and a repetition number 506. In the example shown in FIG. 5, the card 500 includes a graphical depiction 502 of a circle, a direction arrow 504 pointing counter-clockwise, and a repetition number 506 of three.

In other embodiments of the view operation 410, the participant watches an audio-visual recording of the movement instruction. For example, the participant can watch an animated icon moving in accordance with the geometric element and flow direction. In one embodiment, the animated icon may be a colored circle or other shape. In another embodiment, the geometric element or path that the animated icon follows is displayed. For example, in one embodiment, the animated icon can be shown moving along the displayed path.

In other embodiments of the view operation 410, however, the participant watches a performance of the movement instruction by another. For example, the participant can watch an instructor 600 move the instructor's hand a specific number of times in a specific direction 604 in accordance with a geometric element 602. In the example shown in FIG. 6, the participant watches the instructor 600 move the instructor's hand in a circular motion 602 in a counter-clockwise direction 604.

In one such embodiment, the participant views a live performance by another participant or an instructor. In another embodiment, the participant watches a performance recorded on a playable medium, such as a CD, DVD, magnetic disk, flash card, or other memory storage device. In another embodiment, the participant watches a recorded performance obtained from a remote computer, server, or storage device via a network connection. For example, the participant may download the performance over the Internet to a local computer and view the performance on the local computer.

A first determine operation 415 ascertains a movement pattern based on the movement observed during the view operation 410. In certain embodiments, the movement pattern includes one or more geometric elements recognizable to the participants (e.g., geometric shapes). In some embodiments of the determine operation 415, the participant identifies the movement pattern graphically portrayed as a still image. For example, in one such embodiment, the participant identifies the circle pattern 502 printed on card 500 in FIG. 5. In other embodiments, the participant ascertains the circular movement being performed by the instruction 600 of FIG. 6.

In a second determine operation 420, the participant identifies a flow direction based on the movement instruction perceived in the view operation 410. In some embodiments of the second determine operation 420, the participant identifies a directional arrow or other indicia printed as a stationary graphic. For example, the participant can identify the arrow 504 printed on the card 500 as indicating the counter-clockwise direction. In other embodiments, the participant ascertains the direction in which the movement pattern identified in the first determine operation 415 is being executed during the performance. For example, in an embodiment of the second determine operation 420, the participant can ascertain the instructor 600 is moving the instructor's hand in a counter-clockwise direction. In some embodiments, the process 400 completes and ends at a stop module 425.

In other embodiments, however, the process 400 proceeds to a third determine operation 425. In the third determine operation 425, the participant ascertains a number of times the movement pattern is to be repeated. In some embodiments, the participant identifies a repetition number indicated graphically. For example, the participant can identify the number "3" printed on the card 500 of FIG. 5. In other embodiments, however, the participant can determine the number of times a movement pattern is performed by another. For example, the participant can ascertain the instruction 600 of FIG. 6 has moved her hand in a circular pattern three times. As noted above, the process completes and ends at the stop module 430.

Figure 5:
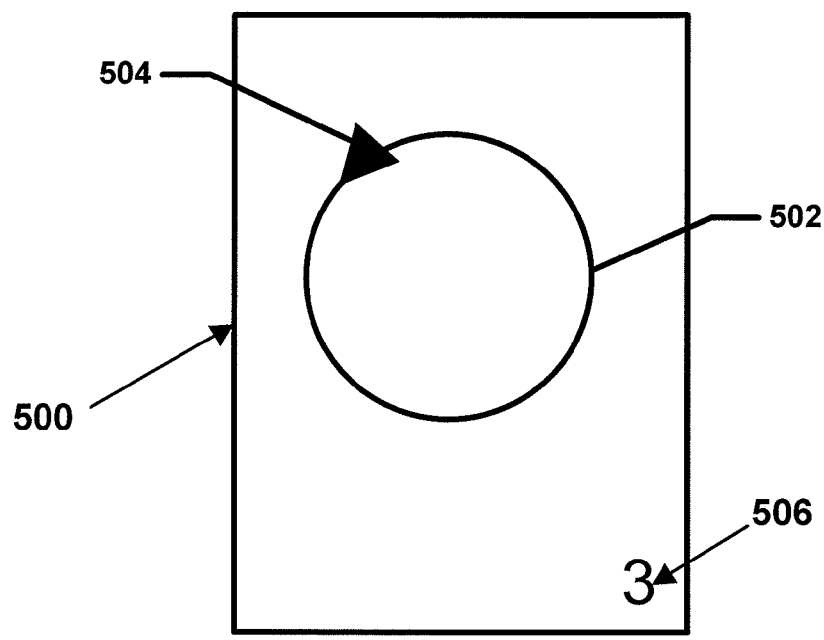
FIG. 5 is a schematic diagram of an example card indicating an example movement instruction in accordance with the principles of the present disclosure.
Figure 6:
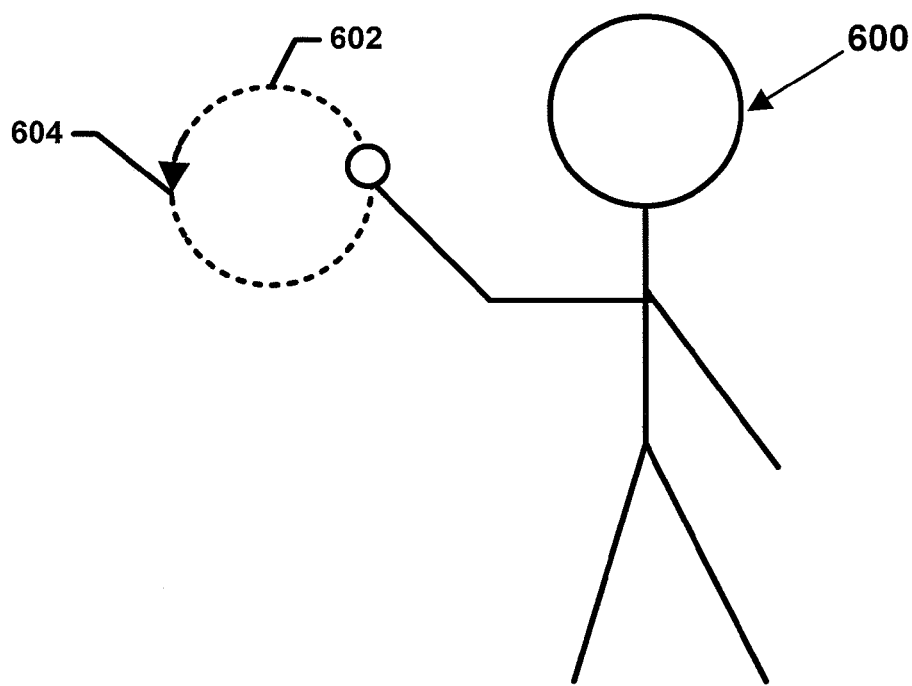
FIG. 6 is a schematic diagram of a person indicating the example movement instruction of FIG. 5 in accordance with the principles of the present disclosure.

FIGS. 5 and 6 provide some examples of different systems that can be used to provide choreographic instructions to participants. In the system shown in FIG. 5, a participant can flip through a deck of cards 500 and perform choreographic instructions indicated on one or more of the cards 500. Music may be played in the background while the participant views the cards 500. Alternatively, each of the cards 500 can graphically indicate a timing instruction, such as a beat pattern, to be followed (see FIG. 8) when performing the indicated movement instruction.

As shown in FIG. 6, in an alternative system, a participant can watch an instructor performing movement patterns. In some embodiments, the participant attends a live performance, such as a class. In such embodiments, the participant can view the movements of an instructor and/or other participants (e.g., students). In other embodiments, however, the participant watches a recorded video performance. For example, the participant can play and view a performance on a television or computer. The performance may be recorded on a DVD, a CD-ROM, Blu-Ray disc, or video cassette tape, or other storage media. Alternatively, the performance can be recorded within the memory of a computer system.

In certain embodiments, the movement instruction can require the participant to view multiple movement patterns simultaneously, distinguish each individual movement pattern, and ascertain the elements (e.g., shape, flow direction, and timing) of each movement pattern. For example, a recorded performance can be edited to overlay footage of the instructor performing a first movement instruction over footage of the instructor performing a second movement instruction. In an embodiment, the participant can be instructed to perform the identified movement patterns sequentially or in a particular order. In other embodiments, the participant can be instructed to perform a selected one of the movement patterns.

Figure 18:
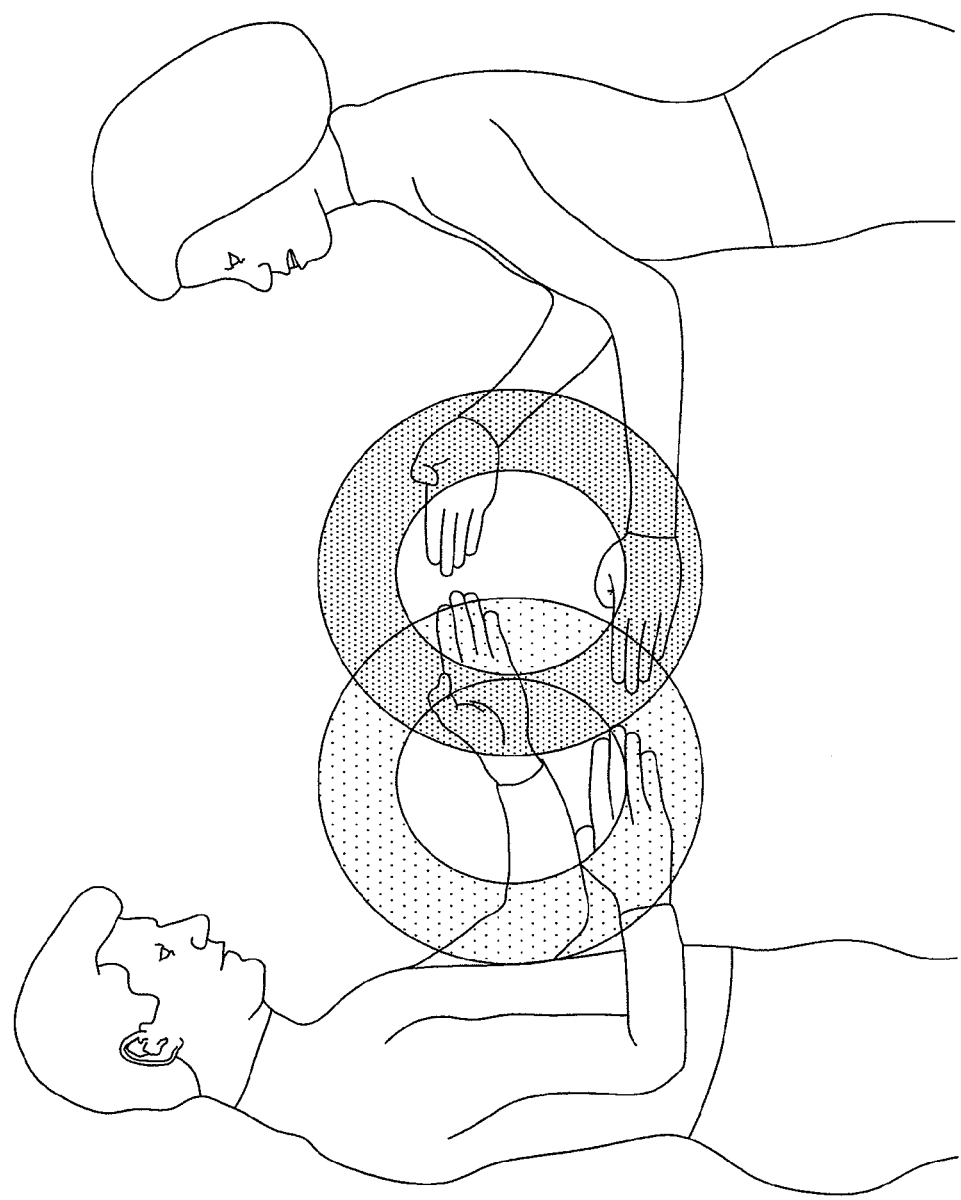
FIG. 18 is a graphic representation of the movement pattern being performed superimposed over the performers in accordance with the principles of the present disclosure.

In other embodiments, the recorded performance can be edited to enhance the depiction of the movement pattern to be performed. In one embodiment, a graphical depiction of the geometric shape to be performed can be displayed while the movement pattern is being performed. For example, a geometric shape on which the movement pattern is based can be superimposed over the instructor prior to, during, or after the execution of the movement instruction (see FIG. 18).

Alternatively, the graphical depiction can be separately displayed from the performance. In some such embodiments, the display can switch between the performance and the graphical depiction. For example, the participant can begin by viewing the graphical depiction of the movement instruction to prepare the participant. Then, the participant executes the movement instruction following along with the performance.

In one embodiment, the display of the performance can be interrupted temporarily. For example, the display may simply become blank for portions of the performance to inhibit the participant from relying too heavily on the performance for the movement or timing instructions. In one such embodiment, the graphical depiction can be temporarily shown during the interruption to remind the participant of the movement instruction without showing the actual performance.

Color coding can further engage the attention of the user, increase the enjoyment of the user, and/or aid in providing additional instructions to increase the difficulty for the user, as described below. In some embodiments, the video can be edited to color code the hands (or arms, legs, etc.) of the instructor based on which movement pattern the hand is performing. In one such embodiment, the movement instruction can require the user to complete the movement patterns sequentially based on a color sequence. In another embodiment, the movement instruction can require the user to complete the movement pattern illustrated by a particular color.

In other embodiments, the recorded performance can be edited to graphically depict the flow direction of the movement instructions. For example, a graphical depiction of a hand can be shown moving in the desired flow direction. In another embodiment, one or more arrows can be shown pointing in the desired flow direction.

The principles of the present disclosure can better be understood through some example applications. FIGS. 7-17 are schematic diagrams depicting example movement instructions and example timing instructions having features that are examples of inventive aspects in accordance with the principles of the present disclosure. In general, the movement instructions shown include a first pattern to be executed using a right side of the participant's body and a second pattern to be executed using a left side of the participant's body.

Figure 7:
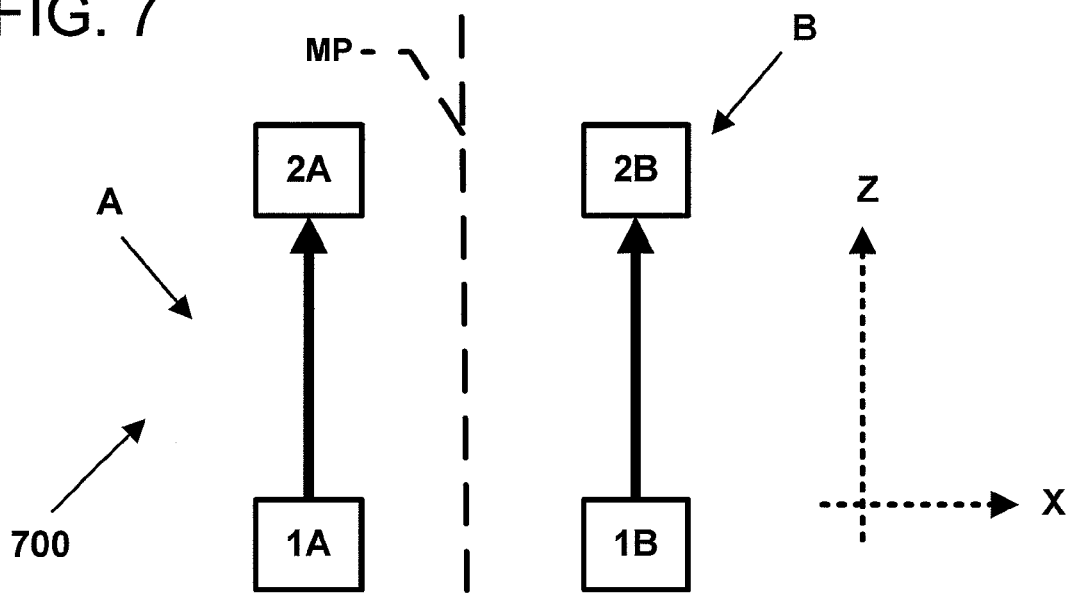
FIG. 7 is a diagrammatic view of one example movement instruction to be executed by a user in accordance with the principles of the present disclosure.

FIG. 7 illustrates an example movement instruction 700 to be executed by a participant. The example movement instruction 700 includes a first movement pattern A and a second movement pattern B. The movement patterns A, B are linear and have identical flow directions. A participant performs the movement instruction by moving a right side of the participant's body according to the first pattern A and a left side of the participant's body according to a second pattern B.

In one embodiment, the first movement pattern A is to be executed using a first hand of the participant and the second movement pattern B is to be executed using the opposing hand of the participant. In such an embodiment, the participant's first hand moves along a z-axis from a first position 1A to a second position 2A and the participant's second hand moves along the z-axis from a first position 1B to a second position 2B. In other embodiments, the movement instruction 700 can be executed with the user's left and right feet. In still other embodiments, the user can execute movement instruction 700 using any desired combination of body parts.

In some embodiments, the movement instruction 700 can be executed cross-laterally. For the purposes of this disclosure, the term "cross-lateral execution" refers to execution of a movement instruction that requires the participant to move a portion of the participant's body across the medial plane of the participant's body. In the example shown in FIG. 7, movement pattern A is to be executed on a first side of the medial plane MP and movement pattern B is to be executed on a second side of the medial plane MP. The participant can execute the movement instruction 700 cross-laterally by performing the first movement pattern A with her left hand on the right side of the medial plane and the second movement B with her right hand on the left side of the medial plane.

In other embodiments, the participant executes the first movement pattern A with her left hand on the left side of the medial plane MP and the second movement pattern B with her right hand on the right side of the medial plane MP. In still other embodiments, the participant can execute the movement patterns homo-laterally. For the purposes of this disclosure, the term "homo-laterally" refers to the execution of a movement instruction using only a single side of the participant's body. For example, the participant can execute the movement pattern 700 homo-laterally by performing the first movement pattern A with her right hand on the right side of the medial plane MP and the second movement pattern B with her right foot on the right side of the medial plane MP.

Figure 8:
FIG. 8 is a diagrammatic view of an example timing instruction to which the example movement instruction of FIG. 7 is to be executed in accordance with the principles of the present disclosure.

In general, the participant executes movement instruction 700 in time to a beat pattern. FIG. 8 illustrates an example beat pattern 800 including beats 802, 804, 806, 808, ..., N. The ellipses and $N^{th}$ beat indicate the beat pattern 800 may include any desired number of beats. For ease in understanding, the beats 802, 804, 806, 808 of the exemplary beat pattern 800 are spaced evenly from one another to create a steady beat. In other embodiments, however, the beats 802, 804, 806, 808 of the beat pattern 800 can be arranged according to any desired timing.

In certain embodiments, each beat 802, 804, 806, 808 in the beat pattern 800 can correspond to a position, such as positions 1A, 2A, 1B, and 2B of FIG. 7, within a movement instruction, such as movement instruction 700. In some embodiments, the participant executes both movement patterns A, B of the movement instruction 700 simultaneously. In the embodiment illustrated in FIG. 7, for example, the participant's first hand begins at a start position 1A on beat 802 and moves to the second position 2A on beat 804. The participant's other hand begins at a start position 1B on beat 202 and moves to the second position 2B on beat 204.

In other embodiments, however, the movement patterns in a movement instruction can be executed sequentially or out of phase. For example, the second hand of a participant can begin to execute the movement instruction after execution by the first hand. In another embodiment, the second hand of the participant can begin to execute the movement instruction after a delay but before the first hand has finished executing the movement instruction. To demonstrate this concept using the movement instruction of FIG. 7, the first hand can begin at the start position 1A at beat 202 and move to the second position 2A at beat 204. The second hand B, however, can begin at the start position 1B at beat 202, remains at the start position 1B at beat 204, and then moves to the second position 2B at beat 206.

Figure 9:
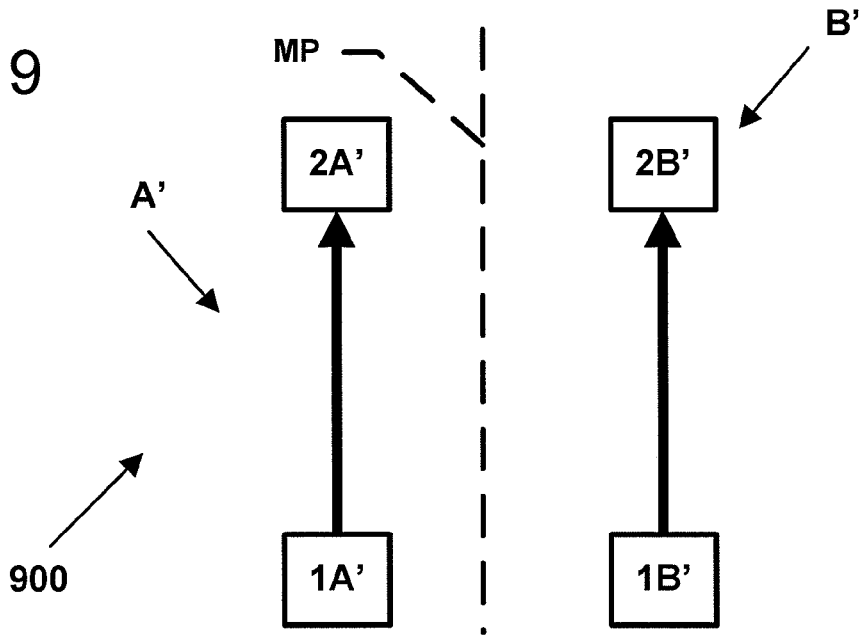
FIG. 9 is a diagrammatic view of another example movement instruction to be executed by a user in accordance with the principles of the present disclosure.

Referring to FIG. 9, each movement pattern of a movement instruction can have a different start position. For example, in the example shown in FIG. 9, a first movement pattern A' has a start position 1A' and a second movement pattern B' has a start position 1B'. The start position 1A' of the first movement pattern is displaced along the Z-axis from the start position 1B' of the second movement pattern B'. In addition, the first movement pattern A' is displaced along an X-axis from the second movement pattern B'.

In certain embodiments, the flow direction with which each movement pattern is executed also can differ. For example, in the embodiment shown in FIG. 9, to execute the movement pattern A', the participant moves a first hand from the start position 1A' upwardly along the Z-axis to an end position 2A'. To execute movement pattern B', the participant moves the second hand from the start position 1B' downwardly along the Z-axis to an end position 2B'.

Figure 10:
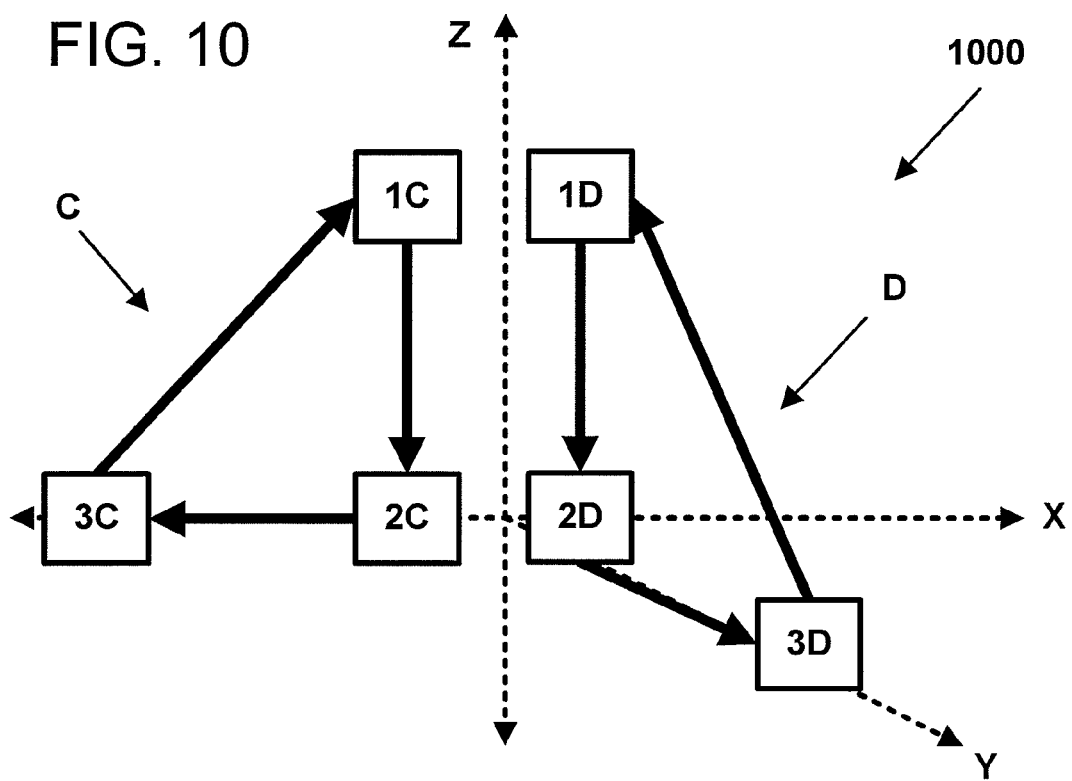
FIG. 10 is a diagrammatic view of another example movement instruction to be executed by a user in accordance with the principles of the present disclosure, the movement instruction involving movement over two planes.
Figure 11:
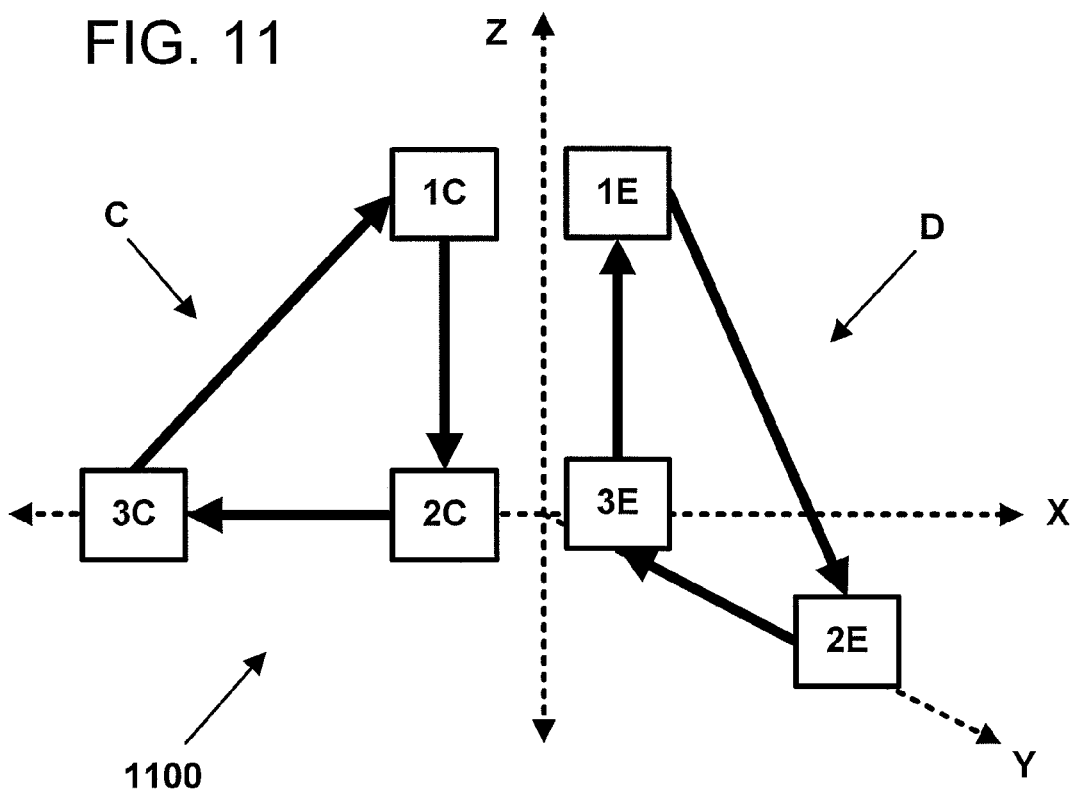
FIG. 11 is a diagrammatic view of another example movement instruction to be executed by a user in accordance with the principles of the present disclosure, the movement instruction involving movement over two planes and in opposite flow directions.

Referring to FIGS. 10-11, movement instructions can be patterns performed over three-dimensions (i.e., over multiple spatial planes). For example, as shown in FIG. 10, a movement instruction 1000 includes a first movement pattern C executed over an X-Z plane and a second movement pattern D executed over a Y-Z plane. The movement pattern C includes three positions 1C, 2C, 3C and the movement pattern D includes three positions 1D, 2D, 3D.

Positions 1C and 2C of the movement pattern C are aligned along a Z-axis and positions 2C and 3C are aligned along an X-axis. Similarly, positions 1D and 2D of the movement pattern D are aligned along the Z-axis and positions 2D and 3D are aligned along a Y-axis. In other embodiments, however, a single movement pattern can be executed over multiple spatial planes (e.g., see pattern G of FIG. 12).

To execute movement instruction 1000 to the beat pattern 800 described above, the participant places her hands or other body parts at start positions 1C and 1D at beat 802. At beat 804, the participant moves the first hand to position 2C and the second hand to position 2D. In the example shown, the participant moves both hands along the same flow direction (e.g., downwardly) to accomplish this movement. At beat 806, the participant moves the first hand to position 3C and the second hand to position 3D. To accomplish this movement, however, the first hand is moved along the X-axis within the X-Z plane and the second hand is moved along the Y-axis in the Y-Z plane. At beat 808, the user returns both hands to the respective start positions 1C, 1D.

In some embodiments, movement instructions can include movement patterns having different flow directions. In such embodiments, the movement instructions require the participant to move different parts of her body in different directions, sometimes simultaneously, to execute the movement instructions. For example, in the embodiment shown in FIG. 11, a movement instruction 1100 includes the movement pattern C of FIG. 10 and a movement pattern E, which includes three positions 1E, 2E, 3E and is to be executed over the Y-Z plane.

In one example embodiment, to execute movement instruction 1100 to beat pattern 800, a participant places her hands at start positions 1C and 1E at beat 802. At beat 804, the participant moves a first hand downwardly along the Z-axis to position 2C and moves the second hand diagonally across the Y-Z plane to position 2E. Each hand moves in a different flow direction to accomplish this movement. At beat 806, the participant moves the first hand along the X-axis to position 3C and the second hand along the Y-axis to position 3E. At beat 808, the participant returns both hands to the respective start positions 1C, 1E, moving the first hand diagonally across the X-Z plane and moving the second hand upwardly along the Z-axis.

Figure 12:
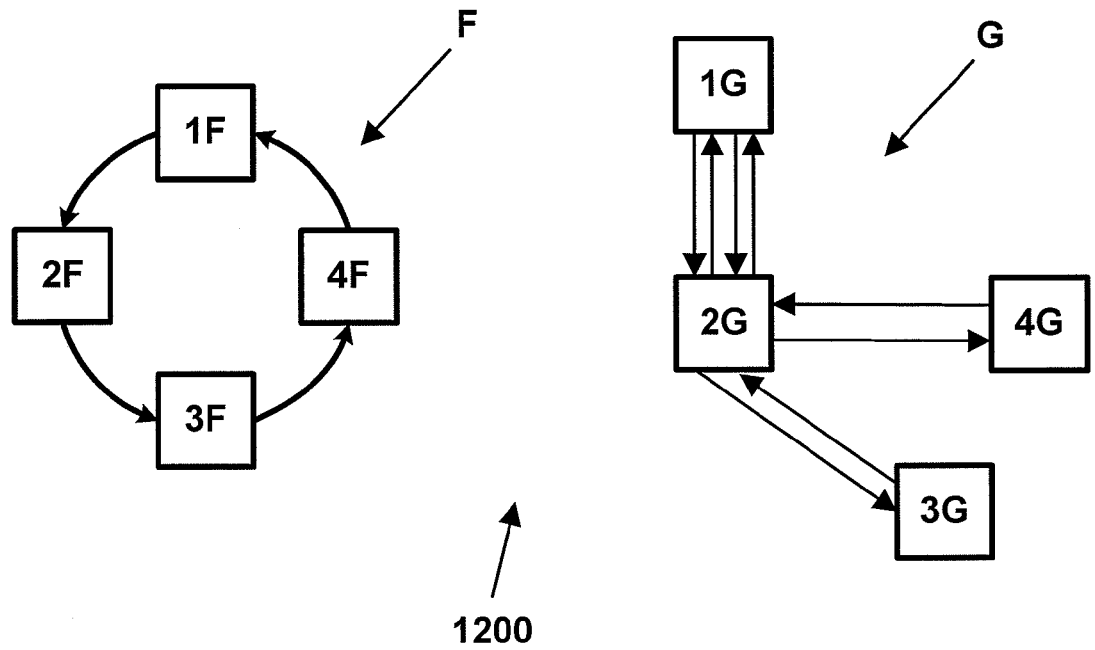
FIG. 12 is a diagrammatic view of two example movement instructions to be executed simultaneously by a user in accordance with the principles of the present disclosure.

Referring now to FIG. 12, a movement instruction can indicate two different movement patterns to be executed concurrently. For example, FIG. 12 illustrates a movement instruction 1200 including a first, generally circular movement pattern F and a second, generally linear movement pattern G. The movement patterns F, G of FIG. 12 also demonstrate that different movement patterns can require different types of movement. For example, movement pattern G requires generally linear movement. Movement pattern F, however, requires generally arced (e.g., curved) movement in order to correctly trace the circular shape of movement pattern F.

The first movement pattern F has a generally circular shape extending over the X-Z plane and includes four positions 1F, 2F, 3F, and 4F lying at substantially equidistant points around the circle. To perform movement pattern F, the participant places a first hand at the start position 1F, moves the first hand along a counter-clockwise arc to the second position 2F, continues the counter-clockwise arc to the third position 3F and then to the fourth position 4F. The participant then moves the first hand back to the start position 1F.

The second movement pattern G also includes four positions 1G, 2G, 3G, 4G, but is not circular. Positions 1G, 2G, and 3G lie along the Y-Z plane and positions 1G, 2G, and 4G lie along the X-Z plane. To perform the movement pattern G, the participant places a second hand at the start position 1G and moves the second hand downwardly to the second position 2G. The second hand is then moved out to position 3G, back to position 2G, and upwardly back to the position 1G. Next, the second hand is again moved downwardly from the position 1G to position 2G and then sideways to position 4G. From position 4G, the second hand is moved back to position 2G and then upwardly back to the start position 1G.

In certain embodiments, the participant can be instructed to perform a first movement pattern of a movement instruction over a different number of beats than a second movement pattern. In an embodiment, the first movement pattern can be repeated while completing execution of the other movement pattern. For example, the movement pattern F can be performed over four beats (i.e., a beat for each position) whereas the movement pattern G can take eight beats to complete. Movement pattern F can be executed twice for each execution of movement pattern G.

In other embodiments, movement patterns can be executed to different beat patterns or to different meters. For example, in one embodiment, the first movement pattern F can executed according to beat pattern 800 in 4/2 time and the second movement pattern G is executed according to beat pattern 800 in 4/4 time, assuming each beat in beat pattern 800 represents a quarter note.

In such an embodiment, the participant starts a first hand at position 1F and a second hand at position 1G. By beat 802, the user moves the first hand half-way to position 2F and the second hand completely to position 2G. By beat 804, the user moves the first hand completely to the position 2F and the second hand completely to position 3G. By beat 806, the participant moves the first hand about half-way to position 3F and the second hand completely back to position 2G. By beat 808, the participant's first hand moves completely to position 3F and the second hand moves completely back to position 1G. The participant has now completed half of the movement instruction 1200. The best pattern 800 can be repeated and the second half of the movement instruction 1200 can be completed.

Figure 13:
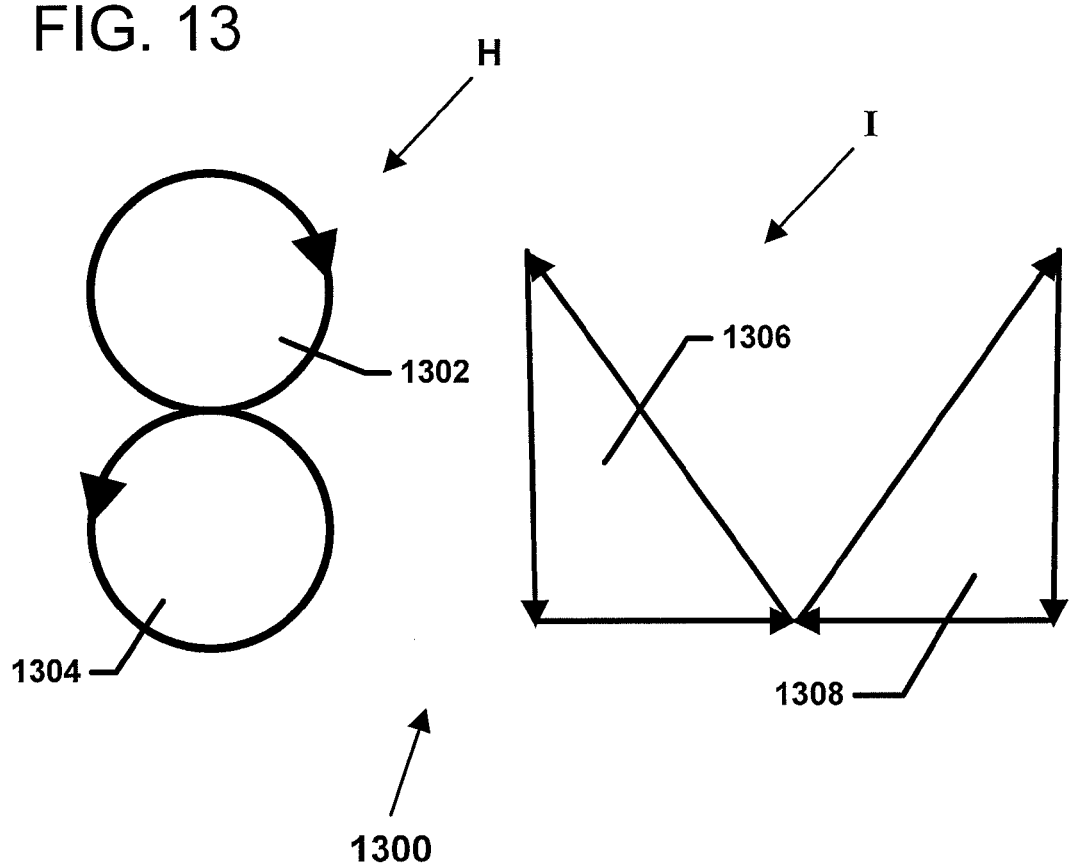
FIG. 13 is a diagrammatic view of examples of complex movement patterns formed by combining simpler geometric patterns or concepts in accordance with the principles of the present disclosure.

Referring to FIG. 13, in certain embodiments, complex movement patterns can be built by combining simpler geometric patterns. For example, FIG. 13 depicts a first movement pattern H requiring the user to trace a "figure eight" pattern and a second movement pattern I requiring the user to trace two adjacent triangular patterns. The figure eight pattern H can be formed by combining two circular patterns 1302, 1304. Movement pattern I can be formed by combining two triangular patterns 1306, 1308.

Figure 14:
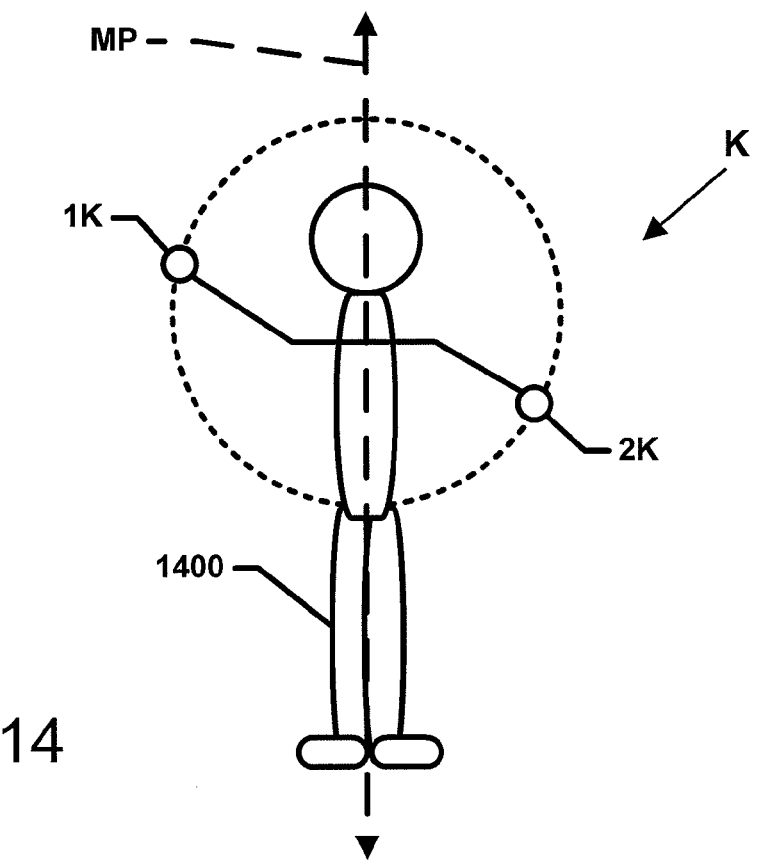
FIG. 14 is a diagrammatic view of an example movement instruction which indicate a cross-lateral flow direction in accordance with the principles of the present disclosure.
Figure 15:
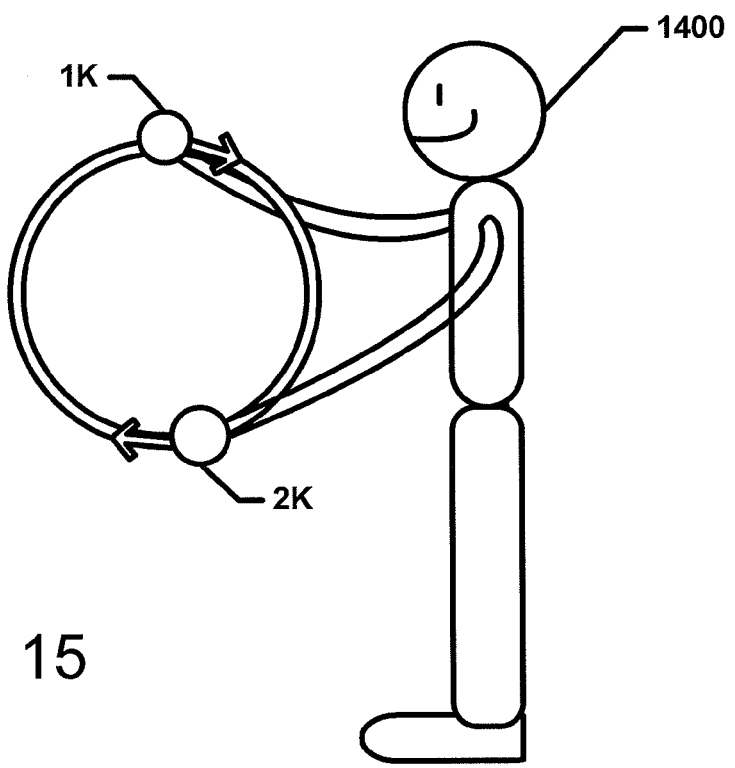
FIG. 15 is a diagrammatic view of another example movement instruction which indicates flow direction moving towards and away from the body of the user in accordance with the principles of the present disclosure

Referring to FIGS. 14 and 15, a movement instruction can include a single movement pattern having different start positions, directional flows, and/or timing for each body part executing the movement pattern. For example, FIGS. 14 and 15 illustrate a movement pattern K having a substantially circular shape. Movement pattern K has a first position 1K and a second position 2K spaced along the circle substantially equidistant from one another. In one embodiment, a participant 1400 can use the first position 1K as a starting position for her right hand and the second position 2K as a starting position for her left hand. In another embodiment, however, the user 1400 can use the same position as a starting position for both hands.

In certain embodiments, an example movement instruction also can indicate flow direction with respect to the orientation of the participant's body. For example, a participant, such as participant 1400, can orient her body so that she executes one or more movement patterns, such as movement pattern K, by moving her hands side to side across the medial plane MP of her body (see FIG. 14). In other embodiments, however, the participant 1400 can orient her body so that she executes the same movement patterns by moving her hands towards and away from her body without crossing the medial plane (see FIG. 15).

Figure 16:
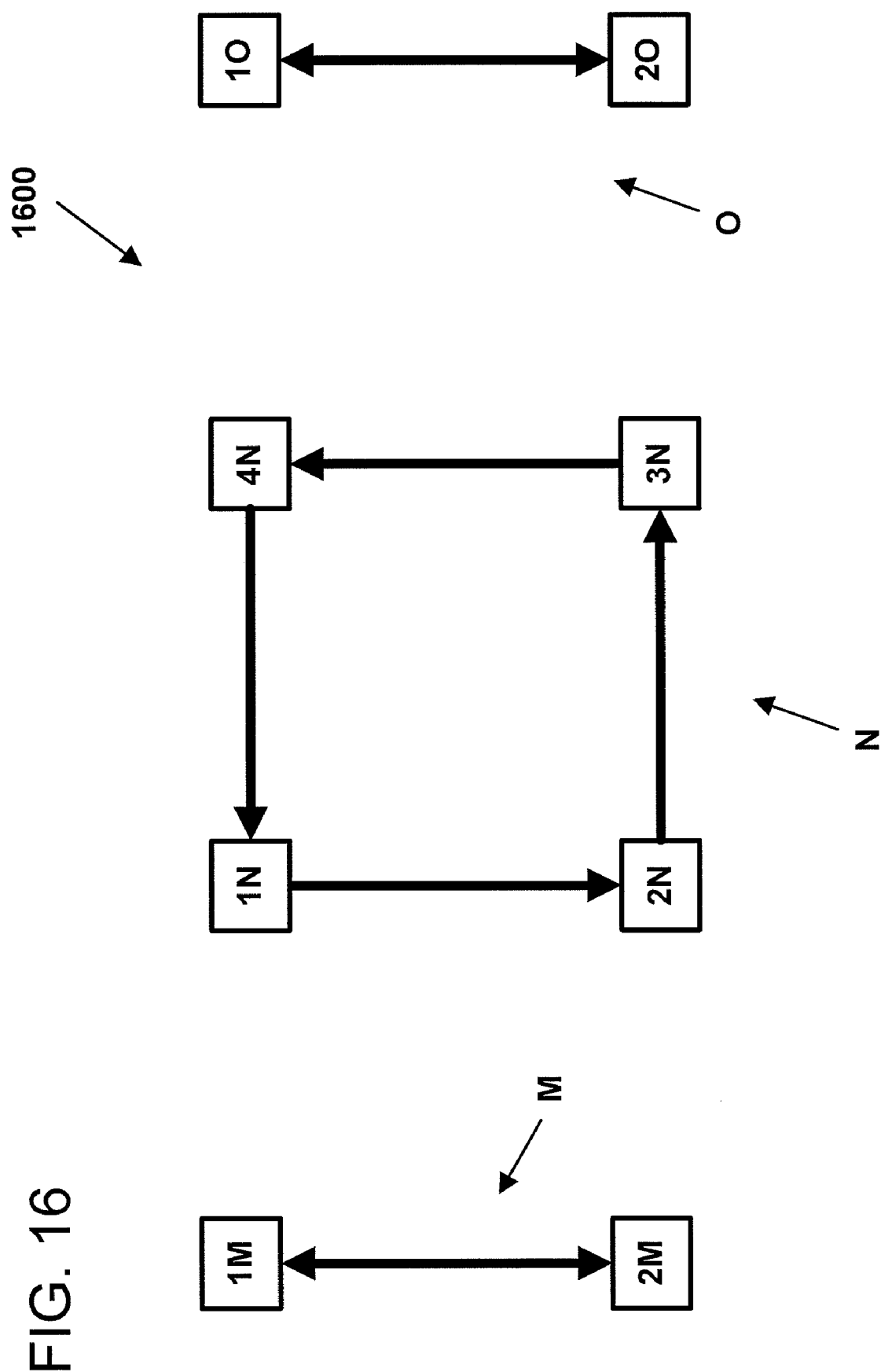
FIG. 16 is a diagrammatic view of an example movement instruction designed to be executed by two or more cooperating users in accordance with the principles of the present disclosure.
Figure 17A:
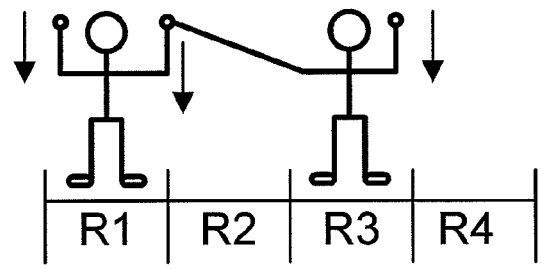
FIGS. 17(A-E) are diagrammatic views of an example movement instruction designed to be executed by two or more cooperating users in accordance with the principles of the present disclosure, the users being required to move their feet as well as their hands.
Figure 17B:
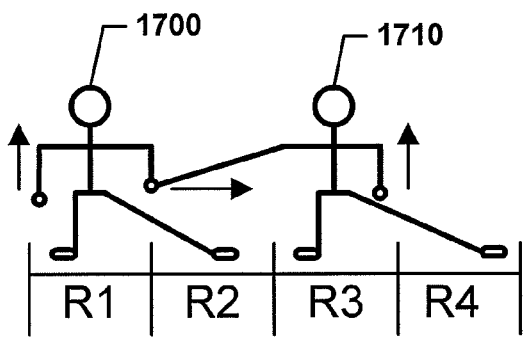
Figure 17C:
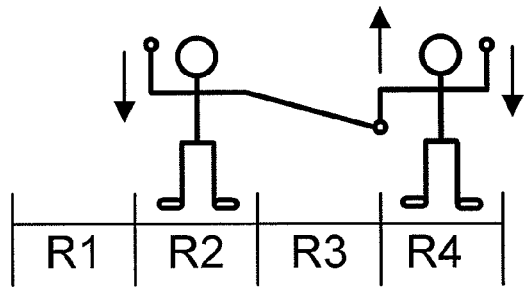
Figure 17D:
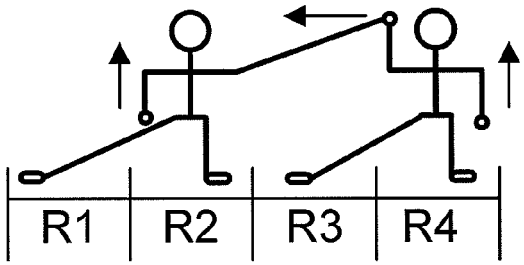
Figure 17E:
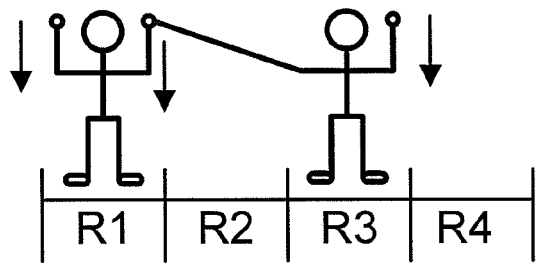

Referring now to FIGS. 16-17(A-E), in certain embodiments, movement instructions can be executed by two or more cooperating users. For example, FIG. 16 illustrates an example movement instruction 1600 including three movement patterns M, N, and O. FIGS. 17A-17E depict a first participant 1700 and a second participant 1710 using their hands to execute the movement instruction 1600. Each FIG. 17A-17E depicts the hand positions of the participants 1700, 1710 after one beat in a beat pattern, such as beat pattern 800. A flow direction for each hand is shown in each FIG. 17A-17E as well.

In the example shown, the first participant 1700 executes movement pattern M with a first hand and movement pattern N with a second hand. Simultaneously, the second participant 1710 executes movement pattern N with a first hand and movement pattern O with a second hand. In other embodiments, one or both participants could perform the respective movement patterns with their feet or other body parts. In the example shown, the first participant 1700 overlaps her second hand with the first hand of the second participant 1710 to perform movement pattern N. In other embodiments, each participant 1700, 1710 can execute movement pattern N in separate regions of space.

In certain embodiments, movement instructions require one or more users to move their entire bodies through space. For example, in the embodiment shown in FIG. 17, the participants 1700, 1710 move within spatial regions R1-R4 while executing the movement instruction 1600 of FIG. 16.

The first participant 1700 begins in region R1 and the second participant 1710 begins in region R2. By the third beat, the first participant 1700 has moved completely into region R3 and the second participant 1710 has moved completely into region R4. By the fifth beat, the first and second participants 1700, 1710 have returned to regions R1 and R3, respectively.

Figure 19:
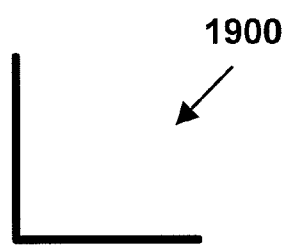
FIG. 19 is a schematic diagram of an example formation pattern in accordance with the principles of the present disclosure.

Referring to FIGS. 19-20, in another embodiment, a movement instruction can provide a formation pattern and a sequence of orientations for the formation pattern. For example, FIG. 19 is a schematic diagram illustrating one example embodiment of a formation pattern 1900. The formation pattern 1900 is generally L-shaped. In other embodiments, the formation pattern 1900 may be generally linear, generally curved, or any other desired shape. In one embodiment, the formation pattern 1900 has a shape capable of being formed with a single limb of a participant (e.g., the participant's arm). In another embodiment, the formation pattern 1900 has a shape capable of being formed with multiple limbs of the participant. For example, a circular or square formation pattern may be formed using both arms of the participant.

FIGS. 20A-20D are schematic diagrams illustrating one example sequence of orientations for the L-shaped formation pattern 1900. In the example shown, the sequence of orientations differs for each limb of the participant. In another embodiment, the movement instruction may indicate each limb should follow the same sequence of orientations. In yet another embodiment, the movement instruction may indicate that only limb should form the formation pattern.

Figure 20A:
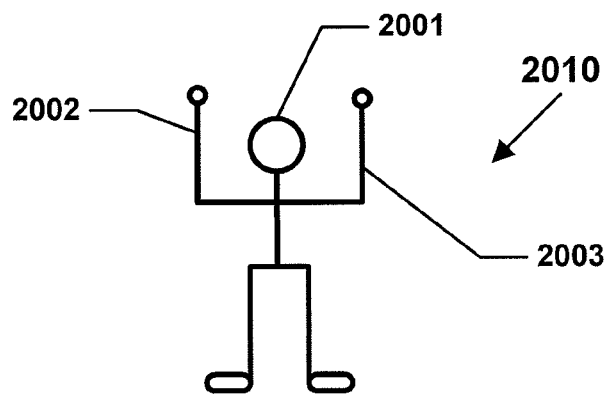
FIGS. 20(A-D) are schematic diagrams illustrating a movement instruction including a sequence orientation positions for the formation pattern of FIG. 19 in accordance with the principles of the present disclosure.
Figure 20B:
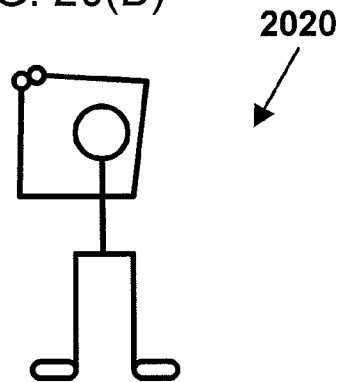
Figure 20C:
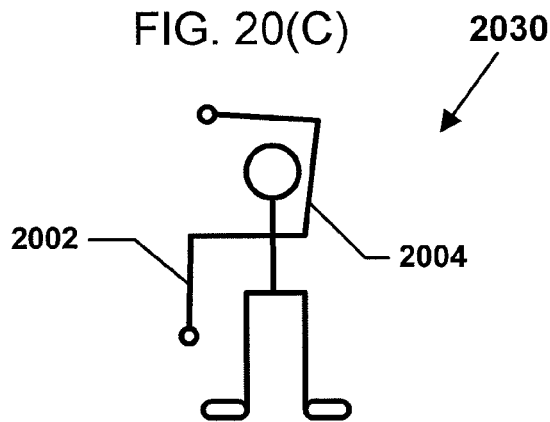
Figure 20D:
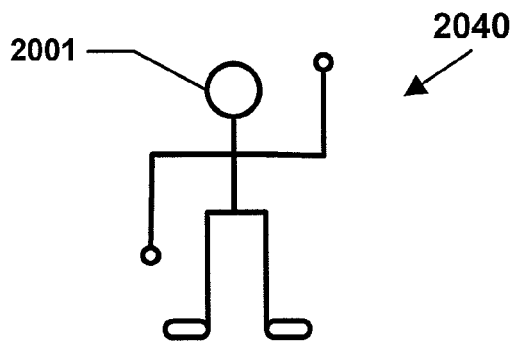

In FIG. 20A, a participant 2001 is instructed to form the L-shaped formation pattern 1900 of FIG. 19 using first and second arms 2002, 2003, respectively, in accordance with a first orientation position 2000A. In the example shown, the first orientation position 2000A includes each arm extending horizontally outwardly from the body and is bent at the elbows to extend vertically upwardly. In FIG. 20B, the participant is instructed to re-orient the formation pattern 1900 of the second arm 2003 in accordance with a second orientation position 2000B. In the example shown, the second orientation position 2000B directs the second arm 2003 to pivot upwardly and towards the first arm 2002 to form a generally square pattern. In FIG. 20C, the participant is instructed to re-orient the formation pattern 1900 of the first arm 2002 in accordance with a third orientation position 2000C. In the example shown, the third orientation position 2000C directs the first arm 2002 to flip about a horizontal axis extending along the horizontal portion of the arm 2002. In FIG. 20D, the participant is instructed to re-orient the formation pattern 1900 of the second arm 2003 in accordance with a fourth orientation position 2000D. In the example shown, the fourth orientation position 2000D directs the second arm 2003 of the participant to pivot downwardly and away from the first arm 2002.

FIG. 21 is a flowchart illustrating an operational flow for an example evaluation process 2100 by which choreographic instructions and feedback may be presented to the participant. The evaluation process 2100 initializes and begins at a start module 2102 and proceeds to a first display operation 2104. The first display operation 2104 provides the choreographic instruction to the participant. For example, the first display operation 2104 can provide a movement instruction and a timing instruction using any of the processes discussed herein.

An obtain operation 2106 acquires compliance data indicating whether the participant successfully executed the choreographic instruction. In one embodiment, the obtain operation 2106 may acquire visual information indicating the movement and timing of a participant. For example, the obtain operation 2106 may film a participant attempting to execute the choreographic instruction with a camera. In another embodiment, the obtain operation 2106 may obtain the compliance data using a gaming system input and controller. For example, the obtain operation 2106 may obtain the compliance data using the gaming system input and controller disclosed in the published application having U.S. Publication No. 2008/0039202, entitled "Game apparatus having general-purpose remote control function," and assigned to Nintendo Co., Ltd., the disclosure of which is hereby incorporated herein by reference. In particular, the portions of the published application pertaining to obtaining and processing movement data are incorporated herein by reference.

A determine operation 2108 evaluates the acquired compliance data by comparing the choreographic instruction to the movement and timing actually performed by the participant (e.g., to the recording of the movement).

A second display operation 2110 provides feedback to the participant regarding the participant's execution of the choreographic instruction. In one embodiment, the second display operation 2110 provides an indication of whether the participant executed the choreographic instruction successfully. In another embodiment, the second display operation 2110 provides an indication of the degree to which the participant executed the choreographic instruction successfully. For example, in different embodiments, the second display operation 2110 may provide a numerical score, graphic indicia, and/or auditory indicia indicating success or lack thereof. The evaluation process 2100 completes and ends at a stop module 2112.

The present invention provides an enjoyable way to integrate the mind and body, increasing focus, balance, and attention skills. Performance of the body puzzles in time to the music may build new neural networks through the sustained repetition of a low stimulus. The movements may activate motor patterns which support myelination that begins at the cortical level and moves to become embedded at the cognitive level. According to some aspects, the invention aids in teaching beat competence and temporal spatial awareness. Other aspects of the invention encourage rhythmic movement. The three major neurotransmitters—norepinephrine, dopamine, and serotonin—concerned with cognition, mood, behavior, and personality, are all increased by movement. Movement also can play an important role in memory, executive function, immune response, mental health, the cardiovascular system, the endocrine system, and the central nervous system. Some embodiments of the invention can be used to enhance athletic performance. Other embodiments may have a therapeutic affect on children with developmental coordination disorders (e.g., developmental dyspraxia). Still other embodiments may have a therapeutic affect on elderly individuals in delaying the onset of dementia and/or other cognitive disabilities.

The above specification, examples and data provide a complete description of the manufacture and use of the composition of the invention. However, the invention is not limited to the example movement instructions and timing instructions illustrated in the figures. Rather, the example choreographic instructions shown are intended only to illustrative some possible embodiments of the invention. Since many embodiments of the invention can be made without departing from the spirit and scope of the invention, the invention resides in the claims hereinafter appended.

The invention claimed is:

1. A method of providing a choreographic instruction on a playable storage medium to a participant, the method comprising:

providing a first movement instruction on the playable storage medium, the first movement instruction indicating a first movement to be executed by a left hand of a participant, the first movement including a graphic portrayal of a first geometric pattern to be made within a first spatial plane and a first flow direction;

providing a second movement instruction on the playable storage medium, the second movement instruction indicating a second movement to be executed by a right hand of the participant simultaneously with an execution of the first movement instruction, the second movement including a graphic portrayal of a second geometric pattern to be made within a second spatial plane and a second flow direction, at least one of the second geometric pattern and the second flow direction being different from the first geometric pattern and the first flow direction; and providing a first timing instruction to which at least the first movement is intended to be executed on the playable storage medium, the first timing instruction including a beat pattern;

wherein the graphic portrayals of the first and second movement instructions indicate how points in the first and second geometric pattern are linked to the beat pattern.

2. The method of claim 1, wherein providing the first movement instruction and providing the second movement instruction includes recording a performance of the first movement instruction and a performance of the second movement instruction on the playable storage medium.

3. The method of claim 2, wherein providing a first timing instruction includes recording music having the beat pattern on the playable storage medium.

4. The method of claim 3, wherein recording music comprises recording music having polyrhythmic timing.

5. The method of claim 1, wherein providing a first movement instruction includes graphically portraying the first movement pattern and the first flow direction on a display screen, and wherein providing a second movement instruction includes graphically portraying the second movement pattern and the second flow direction on a display screen.

6. The method of claim 1, wherein providing a first movement instruction and providing a second movement instruction includes playing the playable media for the participant.

7. The method of claim 1, wherein the second flow direction differs from the first flow direction.

8. The method of claim 1, further comprising providing a second timing instruction to which the second movement is intended to be executed, the second timing instruction differing from the first timing instruction.

9. The method of claim 1, further comprising providing a third movement instruction to be executed on the first side of the participant, the third movement instruction differing from the first movement instruction, the third movement instruction being shown simultaneously with the first movement instruction.

10. A method comprising:
visually displaying a graphic portrayal of a first movement instruction on a display screen, the first movement instruction including a geometric pattern and a flow direction;

visually displaying a graphic portrayal of a second movement instruction on the display screen, the second movement instruction including a second geographic pattern and a second flow direction to be executed in overlapping sequence with the first movement instruction, the second geometric pattern being identical to the first geometric pattern, the second flow direction being opposite from the first flow direction; and audibly playing a first timing instruction having a first beat pattern;

wherein visually displaying the graphic portrayals of the first and second movement instructions includes graphically indicating how points in the first and second geometric patterns are linked to the beat pattern.

11. The method of claim 10, further comprising executing the second movement according to the first timing instruction.

12. The method of claim 10, further comprising:
performing a second timing instruction; and
executing the second movement instruction in accordance with the second timing instruction.

13. The method of claim 10, wherein displaying the first movement instruction comprises displaying a graphic portrayal of a first movement pattern and a first flow direction on a first card.

14. A system comprising:
a playable media storing at least one musical selection, each musical selection having at least one beat pattern, the beat pattern of each musical selection being constant throughout the musical selection;
a viewable media configured to indicate a sequence of movement instructions, each movement instruction including a first hand movement instruction and a second hand movement instruction, the viewable media indicating that the first hand movement instruction is to be executed within a first spatial plane and that the second hand movement instruction is to be executed within a second spatial plane, the viewable media indicating simultaneously execution of the first hand movement instructions and the second hand movement instructions, wherein the viewable media indicates that at least a portion of each hand movement instruction is to be executed cross-laterally.

15. The system of claim 14, wherein the playable media comprises a compact disc.

16. The system of claim 14, wherein the viewable media comprises a DVD.

17. The system of claim 14, wherein the viewable media comprises one or more cards graphically portraying the sequence of movement instructions.

18. The system of claim 14, further comprising:
a display device configured to display the viewable media to a performer; and
a sound emitter configured to play the at least one musical selection of the playable media.

19. The system of claim 18, wherein the display device comprises a video monitor.

20. The system of claim 14, wherein the first spatial plane is different from the second spatial plane.

* * * * *